United States Patent

Kurz

[15] 3,683,509

[45] Aug. 15, 1972

[54] METHOD AND APPARATUS FOR CHECKING TOOL RELIEF ANGLE

[72] Inventor: William I. Kurz, Chicago, Ill. 60631

[73] Assignee: Illinois Tool Works Inc., Chicago, Ill.

[22] Filed: May 18, 1970

[21] Appl. No.: 38,302

[52] U.S. Cl. ................................. 33/201, 33/199 B
[51] Int. Cl. ............................................. G01b 5/20
[58] Field of Search.....33/201, 199 B, 174 P; 73/105

[56] References Cited

UNITED STATES PATENTS

| | | |
|---|---|---|
| 3,208,272 | 9/1965 | Hall, Jr. et al. .................73/105 |
| 2,620,655 | 12/1952 | Priest...........................73/105 |
| 2,974,418 | 3/1961 | Stimson.....................33/199 B |
| 3,231,982 | 2/1966 | Ribich........................33/75 R |
| 3,442,019 | 5/1969 | Breitweiser et al.......33/174 P |

*Primary Examiner*—William D. Martin, Jr.
*Attorney*—Robert W. Beart

[57] ABSTRACT

A method and apparatus for determining the relief angle of the cutting edge on a helical cutting tool is provided by utilizing a sensing probe connecting the tool during relative movement between the probe and the tool in a first plane which can be readily mathematically converted to a functionally requisite angle in a second plate.

10 Claims, 5 Drawing Figures

Patented Aug. 15, 1972
3,683,509
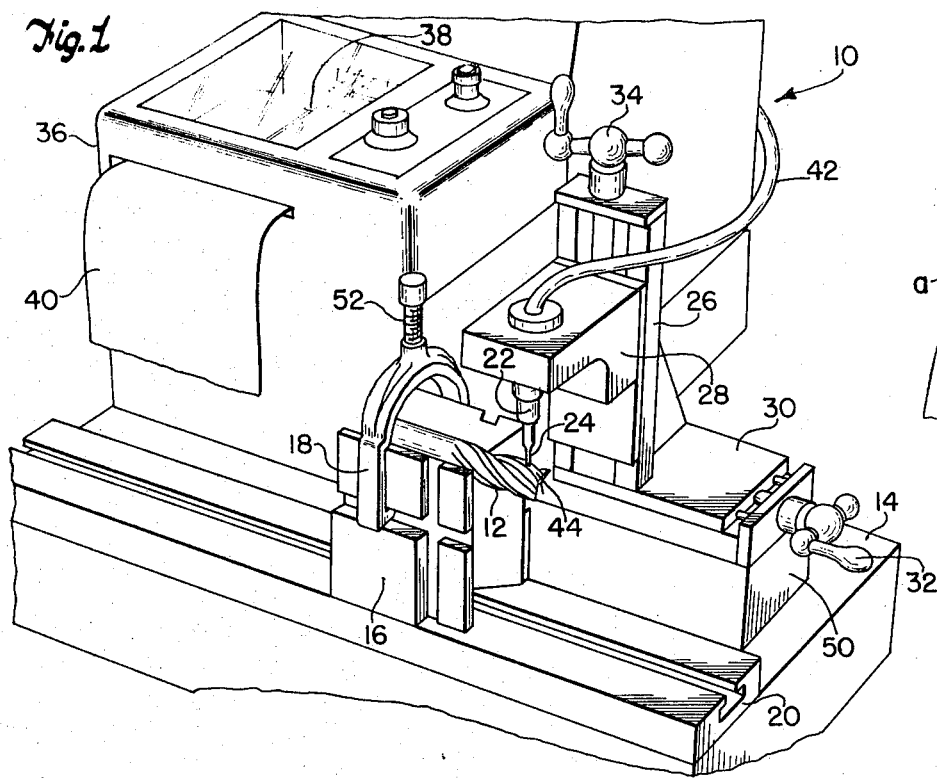
Fig.1
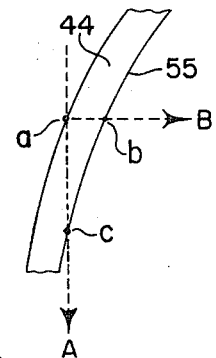
Fig.2
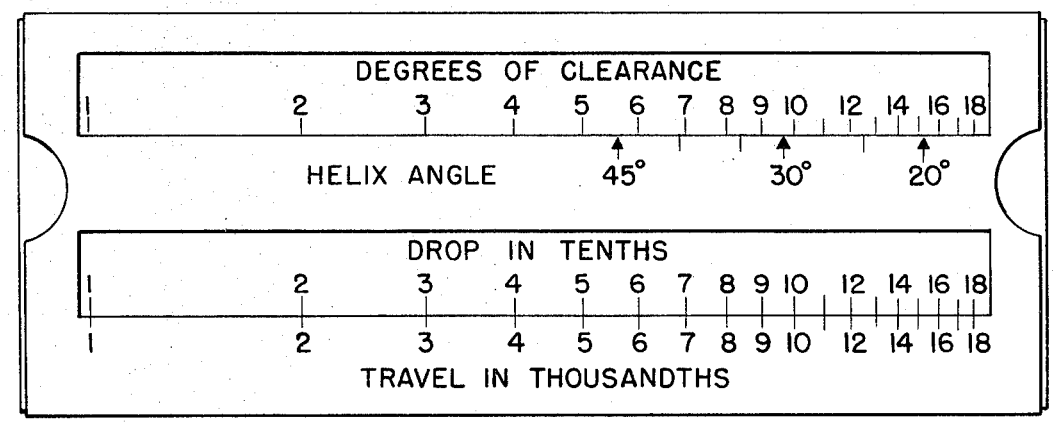
Fig.5
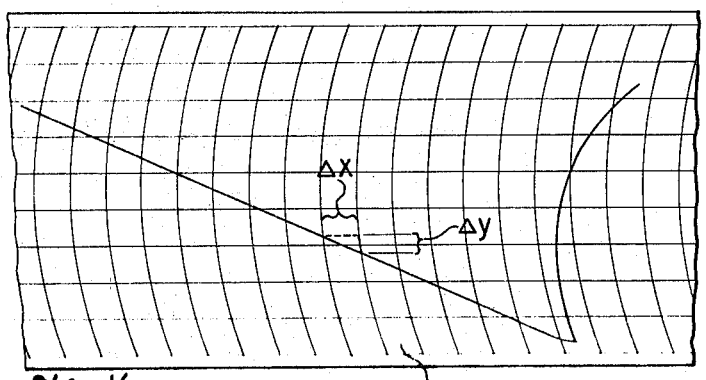
Fig.4
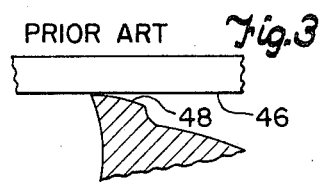
PRIOR ART Fig.3
INVENTOR.
William I. Kurz
BY Barry L. Clark
Robert W. Heart
His Att'ys

METHOD AND APPARATUS FOR CHECKING TOOL RELIEF ANGLE

BACKGROUND OF THE INVENTION

1. Field of the Invention

This invention is generally concerned with measuring the relief angle on a cutting tool.

2. Description of the Prior Art

Many methods and devices have been conceived for measuring the relief angle on cutting tools. The relief surfaces fall generally into three major categories. Flat relief, concave relief and eccentric relief are the major configurations shown to effectively produce backoff clearances required in the cutting tool. The eccentric relief presents numerous problems for the accurate measurement of the relief surface angle thereof since it presents a generally curved surface on a relatively thin land portion of the cutting tool.

Examples of prior art methods and apparatus used for measuring the cutting tool geometry are found in patents to Ribich U.S. Pat. No. 3,231,982 and Gase U.S. Pat. No. 2,648,138. The Ribich method involves placing a flat edge along the relief surface in the transverse plane of the cutting tool and sighting along the longitudinal axis of the cutting tool in an effort to read the angular relationship of the relief surface. The patent to Gase similarly discloses the use of a straight edge placed on the relief surface in a transverse plane to the cutting tool and sighting through an optical instrument in an attempt to accurately read the clearance angle. These methods typify the prior procedure used in determining the relief angle and do not adequately solve the problems inherent in measuring an eccentric relief surface. When it is attempted to measure the effective or tangential relief angle of such a relief surface, which is a convex curve in the transverse plane of the tool, the straight edge of the prior art method must be viewed by the eye in a transverse plane to the curvature of the primary relief surface. The eye is asked to place the testing straight edge in a transverse plane tangent to the archimedean spiral at the peripheral cutting edge. Under the above circumstances, there is uncertainty when a cross hair of a microscope or a line on a comparative screen or a straight edge is matched in this way against a curved surface. It has been found that different operators or inspectors will get different values for the primary relief angle using the prior art method and apparatus. The measuring difficulty is compounded by the fact that the primary relief land, which determines the cutting ability of a cutting tool, is a relatively narrow surface and therefore, it is obvious that matching a straight edge or a line to such a narrow surface to determine its inclination requires skill, experience and care. When the actual small relief surface is curved, the difficulty of getting accurate results is even more pronounced.

SUMMARY OF THE INVENTION

It is therefore an object of the invention to provide a method and apparatus for accurately measuring the clearance angle on cutting tools.

It is another object of this invention to provide a measuring device which requires a minimum of human judgement to determine the relief angle on cutting tools.

It is another object of this invention to provide an apparatus and method for accurately determining the relief surface angle when the relief surface is a narrow, convex surface.

It is still another object of this invention to provide an apparatus and method capable of determining the actual relief angle in the transverse plane of the tool by measuring a relief angle in an axial plane of the cutting tool.

Other objects and advantages of the present invention are accomplished by a method and apparatus which uses a sensing probe to measure the inclination of a relief surface in the axial plane of the cutting tool which measurement can be readily mathematically converted to the functionally requisite angle in the transverse plane. The method of invention involves placing a sensing probe on the relief surface to be measured and moving the tool and the probe relative to one another in an axial plane of the tool, thus tracing a relatively long path over the relief surface and thereafter recording the relationship between the axial distance traveled and the vertical displacement of the probe on a recording device. The recording device utilizes a graph paper which moves proportionally to the relative distance moved in the axial plane of the probe and a recording pen associated with the movable graph indicates the vertical displacement of the probe for an associated movement in the axial plane of the probe. Thus an accurate display is generated representative of the relief surface angle measured in the axial plane of the tool. The displayed angle can readily be converted to the desired relief surface angle in the transverse plane of the tool by a simple computation which is dependent on the particular helix angle of the cutting tool. Alternatively, the conversion may be made by using a specially designed slide rule.

BRIEF DESCRIPTION OF THE DRAWINGS

FIG. 1 is a perspective view of the apparatus of the present invention with the components thereof in place which are necessary for checking the relief angle in the axial plane of the cutting tool;

FIG. 2 is generally a plan view of the relief surface to be measured on a cutting tool illustrating the path of measurement of both the present invention and the prior art;

FIG. 3 is a partial end view of a cutting tool showing a prior art method of measuring the relief angle;

FIG. 4 is an illustration of one form of display showing the relationship between the axial movement of the probe and the vertical displacement of the probe; and FIG. 5 is an illustration of a slide rule to be utilized in conjunction with the invention.

DESCRIPTION OF THE PREFERRED EMBODIMENT

Referring specifically to FIG. 1 there is shown an apparatus for checking the relief surface angle of a helical cutting tool indicated by the reference numeral 10. The clearance checker 10 includes a base 14 which supports a slotted guide 20 and a mounting platform 50 in a side-by-side relationship. A cutting tool 12 is mounted on the apparatus for measurement by means of an axially movable mounting block 16 and a complementary U-shaped mounting clamp 18. The tool is placed in a V-shaped groove in the mounting block and is securely positioned thereto by tightening a fastening element such as threaded element 52 associated with the mounting clamp 18. The mounting block 16 is operatively mounted on the slotted guide which allows the block and associated tool to be moved axially for initially positioning the tool for measurement.

A mounting platform 50 includes a horizontal positioning platform 30 which is controlled by a crank 32. This horizontal platform and crank thus serve as a means for axially feeding an associated testing probe over the surface of a cutting tool. A sensing probe 22 is mounted for operation in a mounting element 28 which is operatively associated with a radial adjustment stand 26. The radial adjustment stand operates similar to the horizontal positioning platform in that the stand also includes a feed element operated by a crank 34. Thus the probe 22 can be moved into and out of contact with the cutting tool while remaining in an axial plane of the cutting tool by selectively operating the crank 34 and moving support 28 up or down. The probe 22 sensitively records a vertical displacement of the sensing tip 24 as the probe progresses axially of the tool along the relief surface 44. These displacements are recorded and displayed through the use of a recorder similar to that shown in U.S. Pat. Nos. 2,261,093 and RE 22,110. This type of recorder, denoted generally as 36 in FIG. 1, includes a tracing pen 38 and automatically fed graph paper 40. The movement of the pen 38 being governed by the displacement impulses which are fed from the sensing tip 24 through an interconnecting cable 42. The movement of the paper is directly associated with the axial movement of the probe so that the resulting display will accurately represent the relationship between the axial movement of the probe and the vertical displacement thereof.

In operation, the tool to be measured is secured on the mounting block and clamp while the sensing probe is positioned on the trailing edge of the relief surface land 44 by radially positioning the probe mount through the radial feed means 34. When the probe is in position, it is then moved in an axial plane of the tool by engaging the crank 32 which moves the horizontal positioning platform upon which is mounted the radial adjustment stand, the probe mount and sensing probe. As the probe moves toward the cutting edge 55, in the direction shown as A in FIG. 2, the sensing tip 24 is displaced in accordance with the relief angle on the cutting tool. This displacement is reflected by the movement of the recording pen 38 on the automatically fed graph 40 which results in the display illustrated in FIG. 4.

From FIG. 2 it is shown that the path of travel A of the probe in the present invention is significantly longer, and presents a larger space from which to measure the relationship between the vertical displacement and the axial distance, than is traditionally presented by the movement in the B direction representative of the prior art method. In conjunction with this, FIG. 3 shows an end view of a cutting tool, having a relief surface 48, the angle of which is to be measured. The typical prior art method involves the placement of a straight edge 46 on the surface 48 in an attempt to measure the angle of the surface 48. FIG. 3 points out the problems inherent in this type of an operation. For example, the relief surface 48 is of an eccentric form which presents a curved surface to be measured and therefor renders it difficult to obtain an accurate reading of the angle of the surface by using a straight edge such as 46.

The relief surface commonly called "eccentric" generally presents a curved surface when viewing the tool in a transverse plane. This eccentric surface is, however, actually part of an archimedean spiral which presents a straight line surface in the axial plane of the cutting tool, such as in the plane associated with the path of travel A in FIG. 2. Therefore, the travel of the sensing probe along the path A will produce a straight line representation of the relationship between the vertical displacement and the axial distance traveled as represented by the graph in FIG. 4. Thus, while the path of contact from point "a" to point "b" in FIG. 2 would be represented as a curved path, the path of contact from point "a" to point "c" would be represented as a straight line path. The straight line path from point "a" to point "c" is susceptible to easy interpretation into an angular relationship. The sharp drop in the line in FIG. 4 represents the probe reaching the extremity of the land and losing contact with the cutting edge 55.

From the above description it is apparent that the display generated by the recorder 36 ostensibly represents the relief surface angle of the cutting tool measured in the axial plane of the tool. Since the common reference to the relief surface angle is in a transverse plane to the tool, further conversion of this display may be desired. In accordance with the concept of the archimedean spiral, a conversion of the measurement of the relief angle in the axial plane of the tool is dependent on the helix angle of the cutting edge of the tool. This relationship is represented as follows:

Tangent of relief angle in transverse plane
$$= \frac{\text{Tangent of relief angle in axial plane}}{\text{Tangent of helix angle}}$$

For example, viewing FIG. 4, $\Delta x$ represents the distance traveled in the axial direction of the sensing probe while $\Delta y$ represents the vertical displacement of the sensing probe associated with the axial distance. The slope of the line represented in FIG. 4, $\Delta y/\Delta x$, thus represents the tangent of the relief angle measured in the axial plane of the tool, as in direction A of FIG. 2. If, for example, the slope represented by $\Delta y/\Delta x$ were to be 0.1000, the measured angle of the relief surface in the axial plane would be 5° – 43'. For a cutting tool having a helix angle of 30°, the tangent of the relief angle in the transverse plane would be represented by $$\frac{\text{Tangent } 5°43'}{\text{Tangent } 30°} = \frac{.1000}{.5773} = .1732$$

Thus, the tangent of the relief angle in the transverse plane would be the arctangent of 0.17321 or 9°, 50'

The conversion of the measured angle in the axial plane of the tool to the angle in the transverse plane of the tool is simplified by the use of a slide rule apparatus shown in FIG. 5. This type of a slide rule takes the relationship between the drop and the travel or $\Delta y$ and $\Delta x$ respectively and converts this relationship directly into the degree of clearance angle in the transverse plane. It should be noted that the other variable involved, the helix angle, is also utilized in the ultimate conversion of the raw data to the desired relief cleance angle in utilizing the slide rule.

Therefore, it will be seen that an apparatus and method has been provided for efficient, accurate determination of the relief angle of a cutting tool utilizing measurement in the axial plane of the tool and subsequent conversion to a true value in the transverse plane.

It should be recognized, that while the apparatus and method have been described with particular reference to the measurement of the peripheral angle when the relief surface is an archimedean spiral, it has also been found that the same novel approach of checking and charting in the axial direction can be used to evaluate relief surfaces having other forms. Therefore, flat, and both convex and concave arcuate relief forms can be accurately charted and analyzed. This advantage comes from the simple nature of the device, its repeatability within narrow limits, and its pictorial presentation in chart form of the results.

I claim:

1. A method of determining the relief angle of a helical cutting tool having an eccentric relief surface behind its cutting edges comprising the steps of:

mounting the tool to prevent its rotation, moving the tool and a relief surface engaging probe relative to each other in the axial direction of the tool, maintaining said probe in engagement with said tool for a predetermined distance along a line on said relief surface of said tool which lies in the axial plane of the tool and converting the amount of displacement of the probe in a direction perpendicular to the axis of the tool which takes place during the predetermined movement of said probe in an axial direction, into the value of the eccentric relief surface angle behind the cutting edge of the tool in a plane transverse to the longitudinal axis of the tool.

2. A method of measuring the edge relief angle of a helical cutting tool in accordance with claim 1 wherein the probe is moved in an axial plane relative to the tool.

3. A method of measuring the edge relief angle of a helical cutting tool in accordance with claim 1 including the steps of:

automatically generating a display showing the relationship of the vertical displacement of the probe to the distance of movement of the probe in an axial direction on a recording device for conversion into relief surface angle in the transverse plane of the tool.

4. An apparatus for measuring the relief angle of an eccentrically relieved helical cutting tool comprising a frame, first mounting means on the frame for mounting the tool against rotation, second mounting means on the frame for mounting the tip of a probe member in engagement with a relief surface on the tool, radial adjustment means for moving said second mounting means and said tool relative to each other so that the tip of said probe may be brought into and out of engagement with said tool in a radial direction and within an axial plane of said tool, feed means for moving said first and second mounting means relative to each other in the direction of the axis of said cutting tool so that the tip of said probe member remains within said axial plane, said tip of said probe member being displaceable relative to said second mounting means in response to changes in the distance between the tool axis and the relief surface of said tool during the relative movement of said feed means, and means for producing an indication of the value of the eccentric relief angle lying in a plane transverse to the longitudinal axis of the tool wherein said indicating means is dependent on and responsive to the displacement of the tip of said probe which occurs during a predetermined amount of movement of said probe in the plane including the longitudinal axis of the tool.

5. An apparatus in accordance with claim 4 which includes guide means for axially positioning the first mounting means on the frame.

6. An apparatus in accordance with claim 4 wherein the radial adjustment means includes a vertical slide and vertical feed means.

7. An apparatus in accordance with claim 4 wherein the means for moving the first and second mounting means relative to each other includes a horizontally movable platform.

8. An apparatus in accordance with claim 4 wherein the display means includes a recorder operatively connected to the probe member.

9. An apparatus in accordance with claim 8 wherein the recorder includes a chart which is movable in conjunction with the axial movement of the probe and a pen which is responsive to the radial displacement of the probe whereby the pen indicates on the chart the radial displacement of the probe along a corresponding axial movement.

10. An apparatus in accordance with claim 8 wherein the recorder includes means for tracing a line representing the relationship between the axial movement of the probe and the radial displacement of the probe thereby providing an effective representation of the relief angle of the tool measured in an axial plane.

* * * * *